United States Patent
Moyse

[11] 3,912,991
[45] Oct. 14, 1975

[54] LINEAR-INDUCTION MOTOR WITH CONTINUOUS ACTIVE TRACK

[75] Inventor: Gaston Moyse, La Courneuve (Seine Saint-Denis), France

[73] Assignee: Moyse S.A., La Courneuve (Seine Saint-Denis), France

[22] Filed: July 18, 1973

[21] Appl. No.: 380,197

[30] Foreign Application Priority Data
July 26, 1972 France .................. 72.26980

[52] U.S. Cl. ............ 318/135; 104/148 LM; 310/13; 318/121; 104/148 LM
[51] Int. Cl.² ..................................... H02K 41/02
[58] Field of Search ........ 310/12, 13; 318/135, 121, 318/122

[56] References Cited
UNITED STATES PATENTS

| | | | |
|---|---|---|---|
| 3,407,749 | 10/1968 | Frig .................................. | 310/13 X |
| 3,719,869 | 3/1973 | Coho ................................. | 310/13 X |
| 3,721,874 | 3/1973 | Pelenc et al. .................... | 318/135 |
| 3,803,466 | 4/1974 | Starkey ............................. | 318/135 |
| 3,815,511 | 6/1974 | Dukowicz et al. ............... | 318/135 X |

*Primary Examiner*—Gerald Goldberg
*Attorney, Agent, or Firm*—Fleit & Jacobson

[57] ABSTRACT

Linear-induction motor having a continuous active track and comprising at spaced intervals along a track at least two fixed stators energized through coil windings supplied with electric current and at least one movable rotor or armature along said track, the total length of the armatures being less than the total length of the track, the branches of the coils of each phase of all the successive stators being connected in series from one to the other end of the track and supplied with current from an alternating-current source, at least one relay member, actuated as a consequence of the movement of said armature past the stator by a higher voltage induced in said coils of said stator having become operative, being associated with each stator for automatically actuating detector circuits for detecting the position of the armature and/or actuating signals, other switch members being provided for short-circuiting the desired stator coils and thus vary the resistance of each stator circuit of the track for modifying the motor speed when necessary.

8 Claims, 11 Drawing Figures

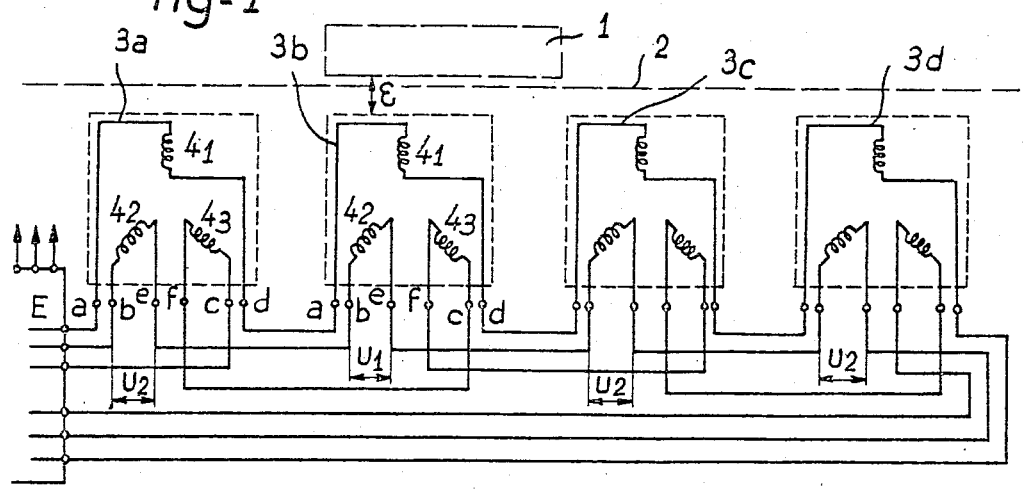
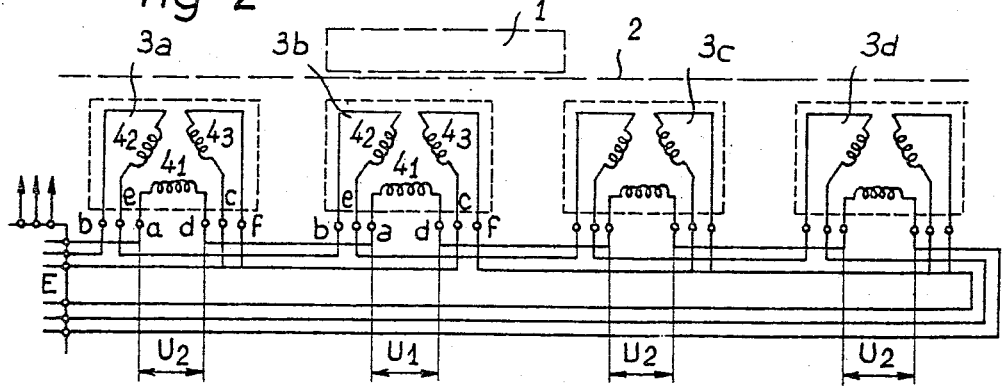
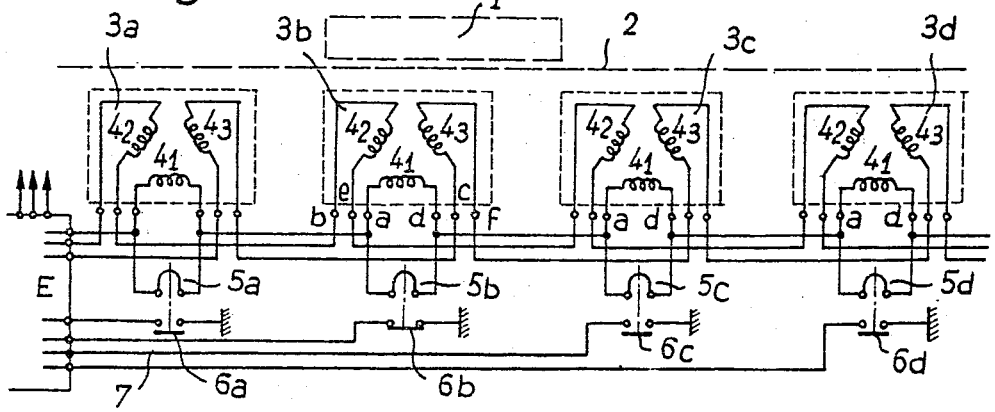

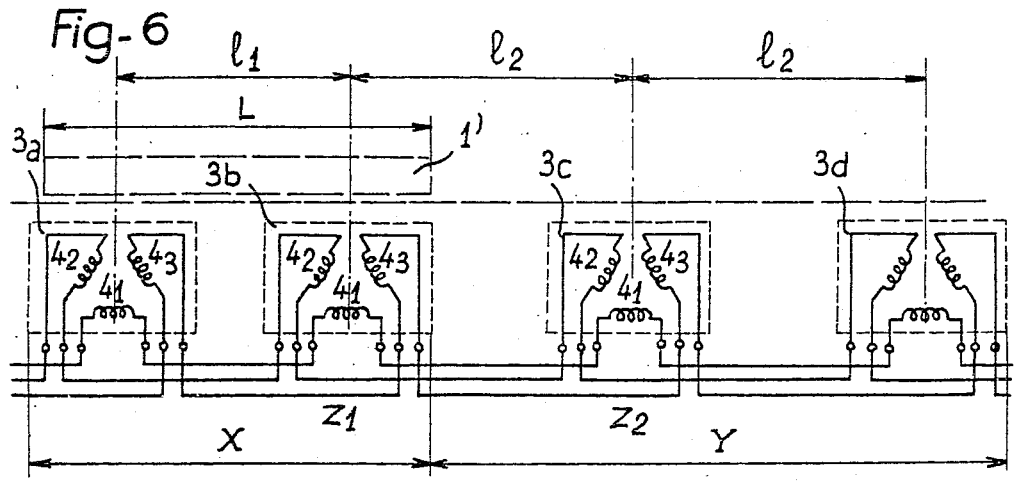
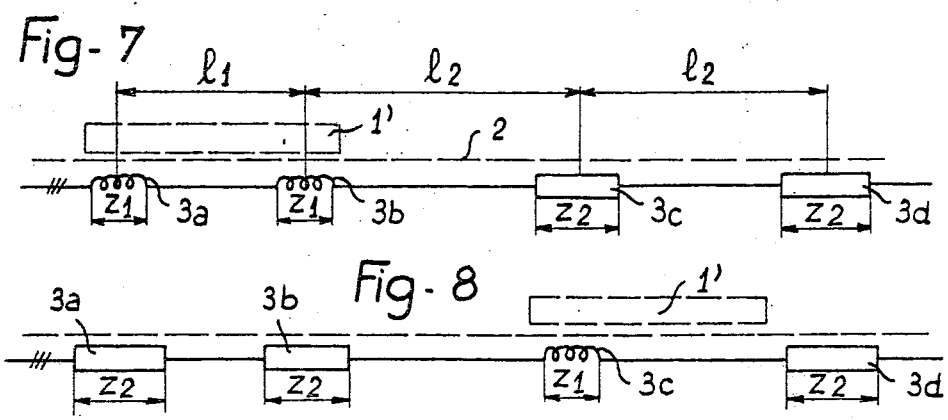
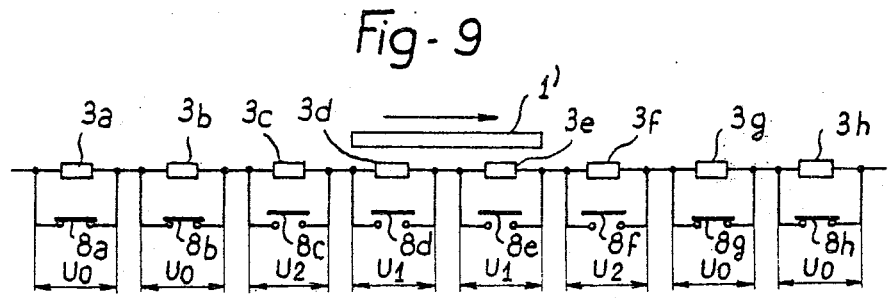

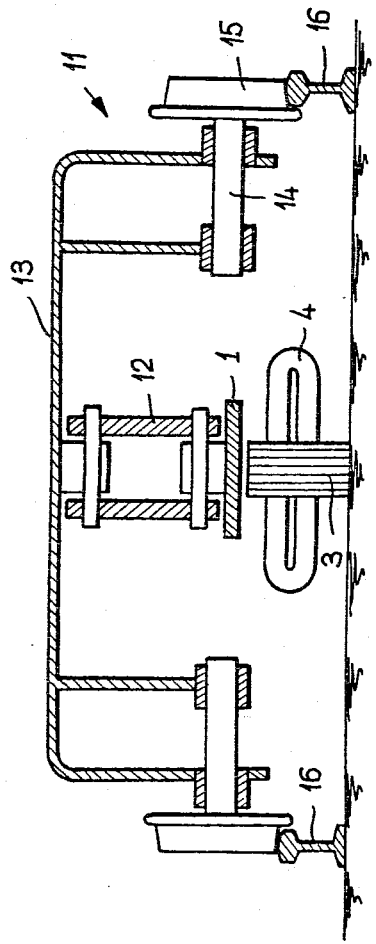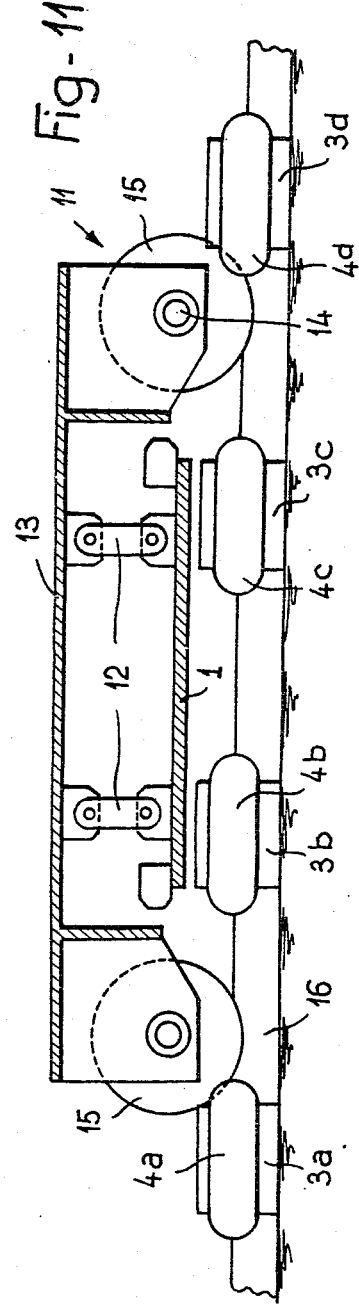

LINEAR-INDUCTION MOTOR WITH CONTINUOUS ACTIVE TRACK

The present invention relates to linear-induction motors (LIMs) of the so-called continuous track type, comprising fixed stators and one or a plurality of movable "rotors" or armatures.

Linear motors comprising fixed stators or magnetic coils disposed along a track for guiding the movable vehicles, and an armature rigid with each movable vehicle are already known. In motors of this type the stator coils are energized as the armature travels along the stators. When for any reason the armature does not reach the stator, the linear motor may happen to be in a state of magnetic short-circuit. To avoid this inconvenience, some means must be provided for detecting the presence of the armature to permit the proper adjustment of the motor energization. However, this solution is attended by the use of a great number of ancillary apparatus for detecting the armature and transmitting and amplifying the signals, so that the capital investment and maintenance expenses are increased considerably.

It is the primary object of the present invention to provide linear-induction motors intended more particularly for transporting and handling heavy loads on relatively short spans, which are free of the above-mentioned inconvenience while permitting a rational exploitation at a reduced cost.

This linear-induction motor having a continuous active track comprises at spaced intervals along a track at least two fixed stators energized through coil windings supplied with electric current and at least one movable rotor or armature along said track, the total length of the armatures being less than the total length of the track, the branches of the coils of all the successive stators being connected in series from one to the other end of the track and supplied with current from an alternating-current source, at least one member, actuated in a manner known per se either as a consequence of the movement of said armature past the stator by a voltage induced in said coils of said stator having become operative, being associated with each stator for automatically releasing armature-detecting means, control means or signal means, other members being provided for short-circuiting the desired stator coils and thus vary the resistance of each stator circuit of the track for modifying the motor speed when necessary.

This restriction on armature length is necessary because of the fact that all of the stator coils are connected in series. As a result, the stators are each always energized. It should also be recalled, as noted above, that the motor is used on relatively short spans.

By causing the inoperative stators to behave as resistive conductors it is possible, if a certain number of stators are isolated from the circuit, to either vary the resistance of the stator circuit and to use same as a conventional starter, or regulate the speed during the armature travel.

According to another feature characterising this invention, the total impedance of the circuit can be varied by modifying the relative spacing of the stators or induction coils in different sections, during the armature travel from one section to another, in order to create different speed areas. This procedure is applicable more particularly in the case of movable armatures overlapping at least two stators in a section where the relative spacing of these stators is reduced, this section being characterised, for example, by a certain vertical slant of the track, notably along curves.

A clearer understanding of this invention will be had as the following description proceeds with reference to the attached drawing illustrating diagrammatically by way of example typical wiring and block diagrams of various forms of embodiment of the linear-induction motor system according to the invention.

In the drawings:

FIG. 1 is a diagram concerning a continuous active track with star-connected three-phase stators having their branches connected in series;

FIG. 2 is a diagram showing the same track but with delta-connected stators;

FIG. 3 is the diagram of FIG. 2 but incorporating relay means for detecting the passage of the armature;

FIG. 6 is an illustrative example of the unequal distribution of stators in two track sections;

FIGS. 7 and 8 show in single-wire diagrams the position of an armature in each one of the track sections of FIG. 6;

FIG. 9 illustrates diagrammatically a linear induction motor with a continuous active track and means for varying the armature speed;

FIG. 10 shows a cross-sectional view of a vehicle having an armature and rolling on a track; and FIG. 11 is a longitudinal sectional view of the vehicle of FIG. 10 on a track.

Figure 4:
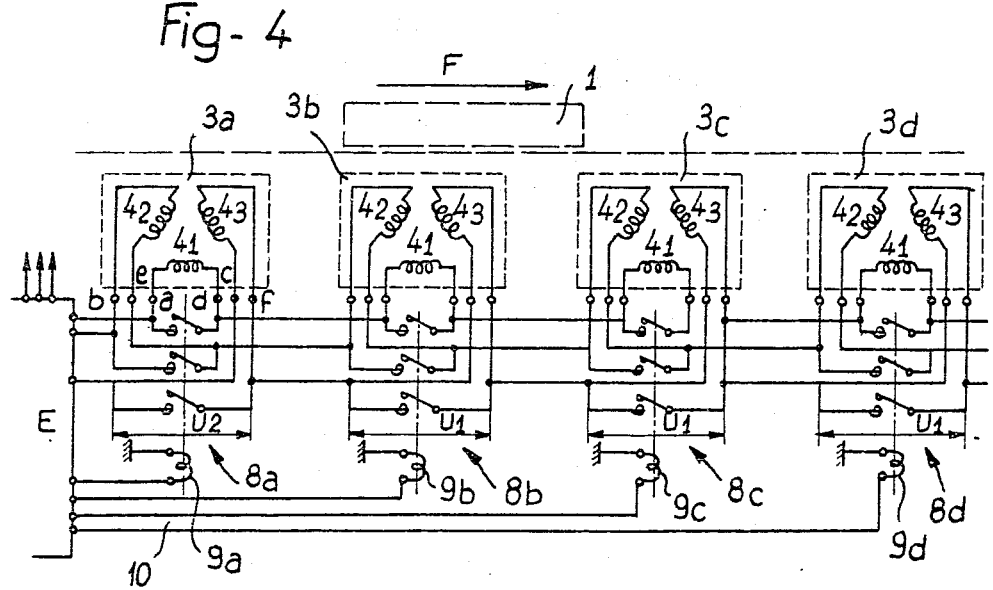
FIGS. 4 and 5 are diagrams corresponding to FIGS. 2 and 1, respectively, but incorporating contactors for short-circuiting the stators.

Referring to FIGS. 1 and 2 of the drawings it will be seen that the linear-induction motor or LIM of the type comprising a continuous active track consists of at least one armature 1 rigid with a movable vehicle adapted to travel along a track shown diagrammatically at 2, and of a series of fixed stators $3a$, $3b$, $3c$, $3d$ disposed at predetermined intervals along the track to be utilized. To illustrate this example, only four stators are shown, but in fact this number depends on the length of the track to be utilized and also on the dimensions of the armature and stators. A vertical magnetic gap $\epsilon$ separates the armature from the surfaces of the corresponding stators.

Such a vehicle 11, as shown in FIGS. 10 and 11, contains an armature 1 which is suspended, e.g., by links 12, to the frame 13 of the vehicle. The vehicle has axles 14 and wheels 15 which roll on rails 16 disposed on both sides of the stators $3a$, $3b$, $3c$, $3d$ having windings $4a$, $4b$, $4c$, $4d$.

Each armature may be of the single or multiple type, and of any known and suitable construction, for instance with a solid mass of magnetic material, or ladder-shifted lamellar structure (i.e. similar to the squirrel-cage rotor of an asynchronous motor), and realized only with a conductive material or with compound materials (that is, magnetic and conductive). In the following examples the armature length does not exceed that of the distance between centers of the stators.

The stators may also be simple or multiple, and comprise coil-windings supplied with energizing current from a suitable power source E feeding several tracks. This current may advantageously be of the alternating, single-phase or multi-phase type, such as two-phase, three-phase, six-phase. By way of example, the stators illustrated in the drawings are supplied with three-phase current and comprise each three winding branches $4_1$, $4_2$, $4_3$ either star-connected as shown in FIG. 1, or delta-connected as shown in FIG. 2.

The coil-windings of all these stators, irrespective of their mounting or of the nature of the current supplied thereto, are connected in series; thus, in FIGS. 1 and 2 the output $d$ of winding $4_1$ of stator $3a$ is connected to the input $a$ of winding $4_1$ of stator $3b$, and so forth. Similarly, the output $e$ of winding $4_2$ of stator $3a$ is connected to the input $b$ of winding $4_2$ of stator $3b$, and so forth, and the output $f$ of winding $4_3$ of stator $3a$ is connected to the input $c$ of winding $4_3$ of stator $3b$, and so forth. The current return to the power source E may flow either through the track or through a return conduit.

With all the coil windings thus mounted in series, the assembly of stators of the track is energized immediately when it is desired to move the vehicle or other moving body carrying, or associated with, the armature 1, the current intensity being the same throughout the circuit. But in the active stator registering with the armature (as in the case of stator $3b$ of FIGS. 1 and 2) the voltage $U_1$ across the terminals of each coil winding $4_1$, $4_2$, $4_3$ will be higher than the corresponding voltage $U_2$ in the inert stators $3a$, $3c$, $3d$ which do not register with an armature, due to the mutual induction produced between the armature and stator. The term "registering" is here used in its customary sense, describing alignment. That is, the stator is active when the armature is in front of it. The respective impedances $Z_1$ in stator $3b$ and $Z_2$ in stators $3a$, $3c$ and $3d$ will be unequal.

This voltage difference between the sections wherein the armature registers with the stator and the sections wherein no armature is present permits of detecting the presence of an armature when the latter registers with the stator.

To this end, a static-voltage or electromagnetic relay $5a$, $5b$, $5c$, $5d$ . . . is connected across the terminals of one of the coil windings of each stator $3a$, $3b$, $3c$, $3d$ for example across the terminals $a$, $d$ of winding $4_1$ as shown in FIG. 3, for controlling a front contacts $6a$, $6b$, $6c$, $6d$ . . . respectively. This relay, of the ON-and-OFF type, is operated only when the voltage across the terminals of the coil winding concerned attains a value $U_1$ and is released at another lower voltage value $U_2$ when the armature does not register with the stator. Each contact $6a$, $6b$, $6c$, $6d$ is adapted to close a detector circuit of an optical or acoustic signal circuit of which the component elements are disposed for example on the operator's control board or instrument panel, and permit of positioning the armature. The relay may also be utilized for controlling any regulation, control or driving servo-means. A multiple-wire signal system 7 connects all the contacts $6a$, $6b$, $6c$, $6d$ of relays $5a$, $5b$, $5c$, $5d$ . . . to the control board, one of the fixed contacts of each relay being grounded, if desired.

Other detection or control members, such as an electromagnetically-controlled contactor coil, a solenoid-valve coil for controlling a pneumatic or hydraulic circuit, the coil of an electromagnetically controlled camshaft, or a pilot light (which may be superposed to one of these control means) may be substituted for, or added to, the aforesaid relays $5a$, $5b$, $5c$, $5d$ . . . , according to requirements.

Figure 5:
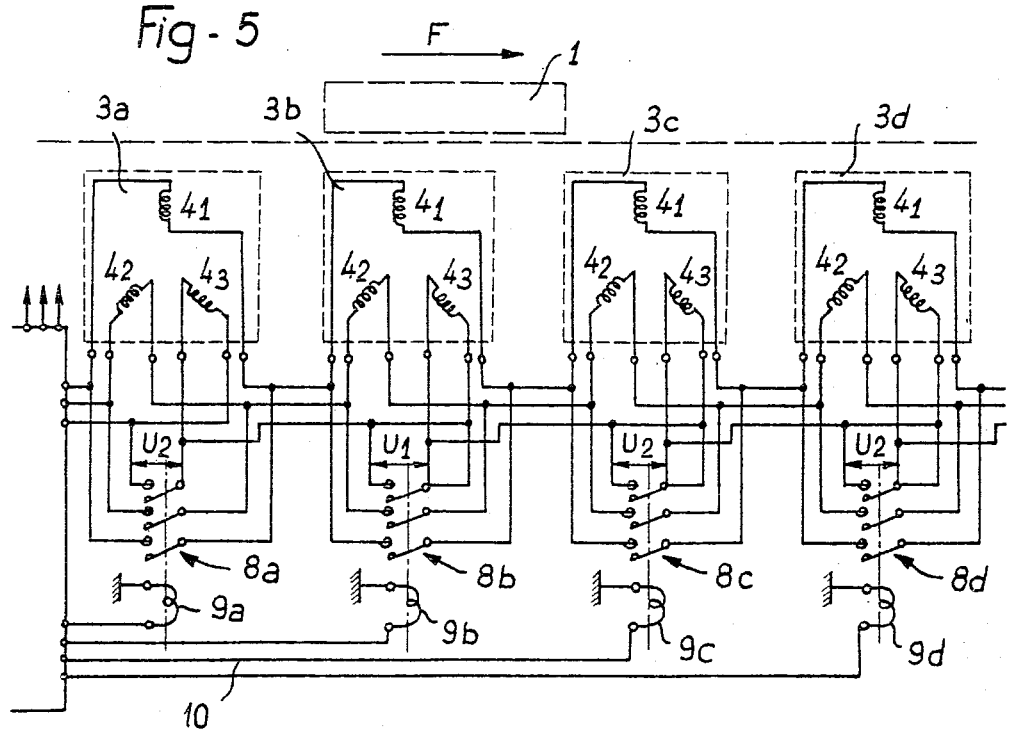

FIGS. 4 and 5 of the drawings illustrate stators $3a$, $3b$, $3c$, $3d$ having their coil-windings delta-and-star-connected, respectively; associated with these stators is a device permitting of utilizing the resistance of said coil windings under relatively low voltage values $U_2$, so as to eliminate them in succession, as the starter of a conventional motor. This device comprises for each stator a three-phase electromagnetic contactor $8a$, $8b$, $8c$, $8d$ . . . , controlled through its coil $9a$, $9b$, $9c$, $9d$ . . . , all the coils being connected to the control board (not shown) via a multiple-wire conduit 10, each contactor blade being connected to the respective terminals $a$-$d$, $b$-$e$ and $c$-$f$ or windings $4a$, $4_2$ and $4_3$.

Power thyristors or static contactors may also be substituted for the electromagnetic contactors or switches. In this case the thyristors are connected across the input and output terminals of the stator windings; the control action consists in this case in remotely energizing their control electrodes so that the thyristor becomes conductive, in order to short-circuit the windings. By discontinuing this energization, the thyristor is blocked and the current is caused to flow through the windings.

When starting the linear-induction motor and assuming that the armature 1 registers with stator $3b$, the operator firstly detects the position of said armature 1 as explained in the foregoing, and then actuates the contactor $8a$ of stator $3a$ which lies behind the aforesaid stator $3b$ in relation to the direction of motion of armature 1, as shown by the arrow F, by energizing the coil winding $9a$. Closing this contactor will short-circuit the three windings $4_1$, $4_2$ and $4_3$ of stator $3a$, and this corresponds to a first step of a conventional starter for an asynchronous motor.

According to requirements, the operator, by actuating the corresponding contactor, eliminates as many stators (preferably at the rear of the one with which the armature is registering as there are starting steps to be obtained. If no stator is present at the rear, he eliminates the remotest stators in the direction of motion of the armature.

The armature position must be determined either visually or by automatic detection as described hereinabove for selecting the stators to be eliminated.

Once the armature is started, it is possible by detecting the armature position to keep alive only the stators registering with, or in close vicinity of, the armature and located forwards with respect to the direction of motion of the travelling armature (or armatures).

As already mentioned hereinabove, in the active-track linear-induction motor according to the preceding exemplary forms of embodiment of a normal track, the armature length being equal to the distance measured between two stators, the distances between the stators are equal and the total impedance of the track is constant. Only one stator has an impedance $= Z_1$, all the others having an impedance $Z_2$ and the armature speed is constant throughout the track length.

Now, in certain cases it may be advantageous or desirable to obtain automatically different travel speeds for a vehicle along a given track section. In this case, notably when the armature length L exceeds the relative spacing $1_1$ between two successive stators, as shown in FIG. 6, the relative spacing of the stators is caused to change from $1_1$ in a first section $x$ to $1_2$ in a second section $y$.

In said first section $x$, as clearly shown in FIG. 6 and also in the corresponding single-line diagram of FIG. 7, the armature registers with two active stators $3a$, $3b$ of the section, whereby each one of these two stators $3a$ and $3b$ will have an impedance $Z_1$, whereas the inert stators (i.e. those without any armature registering therewith) of section $y$ will each have an impedance of $2 Z_1 + 0\ 2 Z_2$, to which predetermined current values and thrust developed in the armature and therefore a predetermined speed, will correspond.

When the movable armature is positioned in section $y$ where the relative spacing of the stators has its major value, as shown in the single-wire diagram of FIG. 8, the armature $1'$ will "cover" only one stator $3c$ of which the inductance is then $Z_1$, whereas the impedance of each one of the other three inert stators will be only $Z_2$. The total impedance of the track will be $Z_1 + Z_2$ and lower than that of FIG. 7. The thrust exerted on the movable vehicle in section $y$ will thus increase and its speed in this section $y$ will be higher than the speed it has in section $x$.

The use of a continuous active track also permits of easily regulating the speed of a movable body or vehicle along the normal active track without resorting to a variation in the supply voltage frequency, according to the known, current practice.

In the case of an armature "covering", say two stators, as shown in FIG. 9, the armature $1'$ registers with stators $3d$, $3e$ each provided with a corresponding short-circuiting contactor $8d$, $8e$, respectively.

Since all the stator coil-windings are connected in series, the voltage across the terminals of the active stators $3d$ and $3e$ will be $U_1$, their contactors $8d$ and $8e$ being open. By detecting the armature position as explained in the foregoing, the contactor $8c$ of upstream stator $3c$ and contactor $8f$ of downstream stator $3f$ having a voltage value $U_2$ are held in their open condition by means of armature-detecting relays, to prevent these armatures from being eliminating during the movement of armature $1'$. With the stators of the present invention connected in series, and depending upon the position of the armatures, some of the stators are active (that is, propelling), while others are inert. The inert stators act as resistances for motor starting. When eliminated from the circuit by short-circuiting any of the inert stators, the voltage of the active stators varies, as when starting a classic induction motor.

Then, to adjust the speed, one or a plurality of stator contactors downstream and/or upstream of stators $3c$ to $3f$ are closed. By way of example, in FIG. 9 the contactors $8a$ and $8b$ of stators $3a$ and $3b$, upstream of stator $3c$, and contactors $8g$ and $8h$ of stators $3g$ and $3h$, downstream of stator $3f$, are shown in their closed condition. Thus, the voltage across the terminals of these stators is $U_o = 0$, and the track impedance is reduced, thus increasing the speed. As the movable vehicle continues its travel, the contactors to be kept closed on either side of said vehicle are moved automatically.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. A linear induction motor system having a continuous active track and comprising at spaced intervals along the track at least two fixed stator members having polyphase coil windings, a source of polyphase alternate electric energy for energizing said windings, at least one armature on a vehicle movable along said track, the phase branches of the coils of all the successive stators being connected in series from one to the other end of the track the output of each stator coil of a given phase being connected to the input of the successive stator coil of the same phase from one to the other end of the track, at least one relay member associated with each stator and actuated when said at least one armature moves past a respective stator, by an increased voltage induced in the coils of said stator when the stator becomes operative, for automatically actuating switch means of a detector circuit, switch members being associated with said stator coils for short-circuiting all coils of a desired stator and thus varying the resistance of each stator coil circuit of the entire track for modifying the motor speed when necessary.

2. A linear induction motor system as set forth in claim 1, wherein said relay member sensitized by a higher voltage of said stator is a relay adapted to actuate hydraulic, pneumatic or mechanical control means for varying the current in the stator coils.

3. A linear induction motor system as set forth in claim 1, wherein said member actuated by a higher voltage in said stator coils is a pilot lamp and/or sound signal connected across the terminals of the stator coil windings.

4. A linear induction motor system as set forth in claim 1, wherein the stator coil-winding short-circuiting members are contactors connected across the terminals of the coil-windings of each stator.

5. A linear induction motor system as set forth in claim 8, wherein said contactors are controlled automatically by electric relays or contactors adapted to detect the armature position.

6. A linear induction motor system as set forth in claim 4, wherein said stator contactors register with an armature and adapted, on either side of said armature, to be held open automatically as a consequence of the actuation of the armature detection relays, said contactors of the other armatures, which lie downstream or upstream and therefore not registering with an armature being adapted to be closed or open at will, under the control of an operator, for varying the linear speed of said movable armature.

7. A linear induction motor system as set forth in claim 1, wherein sections of different lengths are provided between the stators, the length of the armature being such that it registers with at least two atators in the section where the stators have the shortest relative distance, the total impedance of the track stators and the speed of the movable armature varying automatically when passing from one section to the other section.

8. A linear induction motor system as set forth in claim 1, wherein said detector circuit contains armature position detecting means.

* * * * *